US006729063B1

(12) United States Patent
Markels, Jr.

(10) Patent No.: US 6,729,063 B1
(45) Date of Patent: May 4, 2004

(54) METHOD OF INCREASING THE FISH CATCH IN THE OCEAN

(76) Inventor: Michael Markels, Jr., P.O. Box 1549, Springfield, VA (US) 22151

( * ) Notice: Subject to any disclaimer, the term of this patent is extended or adjusted under 35 U.S.C. 154(b) by 0 days.

(21) Appl. No.: 10/248,736

(22) Filed: Feb. 13, 2003

Related U.S. Application Data

(60) Provisional application No. 60/426,820, filed on Nov. 18, 2002.

(51) Int. Cl.$^7$ .............................................. A01K 61/00
(52) U.S. Cl. ......................................... 43/4.5; 119/231
(58) Field of Search ........................ 43/4, 4.5; 119/230, 119/231

(56) References Cited

U.S. PATENT DOCUMENTS

| | | | | |
|---|---|---|---|---|
| 3,488,876 | A | * | 1/1970 | Lowrance ........................ 43/4 |
| 4,137,869 | A | * | 2/1979 | Kipping ....................... 119/231 |
| 5,040,486 | A | * | 8/1991 | Pack ........................... 119/231 |
| 5,433,173 | A | * | 7/1995 | Markles ....................... 119/231 |
| 5,535,701 | A | * | 7/1996 | Markels ....................... 119/231 |
| 5,967,087 | A | * | 10/1999 | Markels ....................... 119/231 |
| 6,056,919 | A | | 5/2000 | Markels, Jr. |
| 6,200,530 | B1 | | 3/2001 | Markels, Jr. |
| 6,269,582 | B1 | | 8/2001 | Feld |
| 6,408,792 | B1 | * | 6/2002 | Markels ....................... 119/231 |
| 6,408,793 | B1 | | 6/2002 | Rutter |
| 6,440,367 | B2 | | 8/2002 | Markels, Jr. |
| 2001/0002983 | A1 | | 6/2001 | Markels, Jr. |

OTHER PUBLICATIONS

John R. Hunter and Charles T. Mitchell, *Association of Fishes with Flotsam in the Offshore Waters of Central America*; Fishery Bulletin (1966): vol. 66, No. 1, pp. 13–29.
John R. Hunter, *Fishes Beneath Flotsam*; pp. 280–287.
John R. Hunter and Charles T. Mitchell, *Field Experiments on the Attraction of Pelagic Fish to Floating Objects*; (1968) J. Cons. Perm. Int. Explor. Mer 31, No. 3, 427–34, Copenhague, Janvier 1968.
Charles T. Mitchell, *Fishes Associated with Drifting Kelp, Macrocystis Pyrifera, of the Coast of Southern California and Northern Baja California*; (1970) reprint from Calif. Fish and Game 56(4): 288–297.

* cited by examiner

*Primary Examiner*—Kurt Rowan
(74) *Attorney, Agent, or Firm*—Bacon & Thomas, PLLC

(57) ABSTRACT

A method of increasing the fish catch in the ocean is to fertilize the ocean surface, creating a short-term phytoplankton bloom, which forms a fish attractive device (FAD). The FAD attracts the fish to a planned location for fishing boats to catch with reduced fishing effort. The bloom may be created by the short-term addition of a chelated iron fertilizer to the ocean surface, and may have a duration of from about 1 to about 2 months.

20 Claims, No Drawings

METHOD OF INCREASING THE FISH CATCH IN THE OCEAN

This application claims the benefit of provisional application 60/426,820 filed Nov. 18, 2002.

BACKGROUND OF INVENTION

The field of the invention is the attraction of ocean fish to a planned location to enhance the return from fishing effort.

About two-thirds of the cost of wild fish caught in the open ocean is the effort of finding the fish and about one-third is the effort of catching and processing them. For this reason fishermen pride themselves on knowing where the fish congregate in order to gain a full trawl, long-line or net. One approach that fishermen take is scattering fish food or chum to attract migratory or pelagic fish, but this is expensive and short term. Fishermen have noticed that fish will congregate under floating patches of seaweed and under docks and floats. This has led to the use of fish attractive devices, called FADs. These are floats, about 100 square feet to 200 square feet in size, that provide a shadow in the ocean water to attract the fish, which then congregate there. These FADs are small and require deployment and retrieval by the fishing vessels.

SUMMARY OF INVENTION

A large FAD (Fish Attractive Device) can be achieved at low cost by fertilizing the ocean surface to create a bloom of phytoplankton of sufficient density to form a patch. These biological FAD patches may exist for about 1 to 2 months after creation.

A method of increasing the fish catch in the ocean may comprise the following steps: (1) testing an area of the surface of the ocean to confirm that each macronutrient is present at a first predetermined level that allows for the production of phytoplankton; (2) testing the area of the surface of the ocean to confirm that a first micronutrient is present at a second predetermined level which limits the production of phytoplankton; (3) testing the area of the surface of the ocean to confirm that the rate of diffusion is at a third predetermined level which allows for the production of a patch of phytoplankton; (4) applying a fertilizer comprising the limiting micronutrient to create a patch of phytoplankton in the area of the surface of the ocean; and (5) harvesting the fish underneath and in the area of the patch.

A method of creating an FAD in the ocean may be achieved by the following steps: (1) testing the water at the ocean surface to determine the nutrients that are missing or are in a limiting concentration; (2) applying a fertilizer that releases an appropriate amount of these missing or limiting nutrients in a form that remains available to the phytoplankton such that these nutrient do not leave the photic zone by precipitation to any appreciable extent; and (3) selecting an area of the ocean which has waters that do not rapidly mix either horizontally or vertically (the water should have a diffusion coefficient less that 6.7 square miles per day) and be in the general area of pelagic and migratory fish patterns. In oceans, sufficient sunlight to support the process of photosynthesis is present in only the about 100 to about 200 meters of water beneath the surface of the ocean. The term photic zone may be used to describe this area, where all of the ocean's photosynthesis takes place. Below the photic zone, there is the aphotic zone where there is insufficient light to support photosynthesis.

A nutrient is present at a limiting concentration if the production of phytoplankton is reduced to a significant extent by the level of that nutrient in the ocean water. An appropriate amount of such a limiting nutrient is an amount needed to raise the concentration of that nutrient in the photic zone so that the bloom of phytoplankton is no longer reduced to a significant extent by the concentration of that nutrient. In most of the ocean the limiting nutrient is iron. Thus, a preferred fertilizer of the present invention comprises chelated iron. The preferred chelates include lignin acid sulfonate.

The diffusion rate varies in the ocean water. The method is preferably carried out in an area of the ocean that does not mix so rapidly that the patch is dispersed before the fish are attracted.

An appropriate amount of a missing micronutrient is an amount that permits the phytoplankton to bloom to a substantially greater extent as permitted by the macronutrients in the ocean water, which are usually nitrate, phosphate and silicate.

The number of fish that aggregate per unit of patch area may be used to determine optimum patch size. If the patch exceeds the optimum, then the return per unit of patch area will decrease, and if too small then the mixing and diffusion will obliterate the patch before the fish can aggregate to a significant extent.

The environmental effects of the fertilized patches are expected to be benign. Chelated iron is used as a dietary supplement for people and as a terrestrial iron fertilizer for gardens. Phytoplankton secrete chelating agents into the ocean water in an effort to keep iron available for making the chlorophyll required for plant growth. The chelated iron has a lifetime in the ocean water of about 40 days so the patch does not have to be revisited. Instead, a new patch may be created in a new location.

DETAILED DESCRIPTION

Fertilizing the ocean surface to produce a local bloom of phytoplankton may produce an effective FAD patch that increases the concentration of fish in and under the patch by perhaps 20 times. Since the fishermen would know where the patch is because they put it there, they would expend minimal resources finding the fish. This may reduce the cost of the fish catch by two-thirds, about $0.40/lb. from a total of $0.60/lb. average for ocean fishing.

The optimum size and location of the patch depends on ocean conditions but is expected to be between 25 square miles and 125 square miles. The diffusion in the ocean water may decrease the concentration of iron in the center of a 30 square mile patch to about 20% of the initial concentration in about 10 days, and to about 11% in about 40 days. Laboratory measurements in oxygenated sea water show a decrease in dissolved iron from about 7.5 nm iron ($7.5 \times 10^{-9}$ moles iron per liter) to about 3 nm iron ($3 \times 10^{-9}$ moles iron per liter) in about 40 days due to a breakdown of the chelate, in this case lignin acid sulfonate. Other chelating agents can also be used, such as ethylene diamine tetraacetic acid (EDTA).

One area in the ocean for a FAD patch is in the south Equatorial Current west of the Galapagos Islands. Other locations that have been tested positively for phytoplankton blooms are: the Southern Ocean off of Antarctica, the northwestern Pacific Ocean south of the Aleutian Islands and the Gulf of Mexico. The area selected must be tested for ocean chemistry to determine whether the concentrations of macronutrients are sufficient to sustain a bloom with the addition of micronutrient, such as iron. The ocean currents in the area must be measured to determine the rate of diffusion, so those suitable concentrations of nutrients are maintained over the life of the patch, which is preferably about 40 days. The concentration of pelagic and migratory fish in the general vicinity of the area should be estimated to assure adequate return for the FAD patch. A spiral or square patch may be laid down in the water around a floating central buoy. The waters inside the patch and outside should be sampled and the fish concentration determined. This should be done daily over the period of the fertilization and harvest, which is preferably about 40 days. Fish concentrations both in the surface waters and beneath the thermocline are needed to plan for maximum return for fishing effort expended. The fish concentration is expected to rise slowly over about the first 10 to 15 days then peak and fall rapidly when the phytoplankton bloom fades.

Fishing vessels assembled to take advantage of the fish attracted to the patch can start to harvest the catch as the fish concentration rises. The gear, fishing strategy and fishing effort will vary depending on the ocean conditions and the types of fish attracted. When the fish catch falls, the remnants of the patch may be abandoned and a new patch started in another location. Since migratory fish, such as tuna, are likely to be the most profitable, it may prove useful to seed the patch with anchovetta or other filter-feeder fish as an additional attraction.

The addition of chelated iron to the barren ocean should increase the iron concentration from about 0.1 nm iron ($0.1 \times 10^{-9}$ moles iron per liter) to a range of from about 4 nm iron ($4 \times 10^{-9}$ moles iron per liter) to about 6 nm iron ($6 \times 10^{-9}$ moles iron per liter). This takes about one ton of chelated iron fertilizer per 10 square miles of ocean water or about 3 tons of fertilizer for a 30 square mile patch where the thermocline is 90 feet deep.

The present method of increasing the fish catch per unit of fishing effort does not increase the total production of fish in the ocean. In order to increase the fish production in the ocean continuous fertilization is required as disclosed in U.S. Pat. Nos. 5,433,173, 5,535,701, 5,967,087, and 6,408,792, which are hereby incorporated by reference.

Variations of the invention may be envisioned by those skilled in the art and the invention is to be limited solely by the claims appended hereto.

What is claimed is:

1. A method of increasing the fish catch in the ocean comprising the following steps:
   (1) testing an area of the surface of the ocean to confirm that each required macronutrient is present at a first predetermined level that allows for the production of phytoplankton;
   (2) testing the area of the surface of the ocean to confirm that a first micronutrient is present at a second predetermined level which limits the production of phytoplankton;
   (3) testing the area of the surface of the ocean to confirm that the rate of diffusion is at a third predetermined level which allows for the production of a patch of phytoplankton;
   (4) applying a first fertilizer comprising said first micronutrient to create the patch of phytoplankton in the area of the surface of the ocean; and
   (5) harvesting the fish underneath and in the area of the patch.

2. The method of claim 1, wherein said first fertilizer releases an appropriate amount of said first micronutrient in a form that remains available to the phytoplankton such that said first micronutrient does not leave a photic zone of said area of the surface of the ocean by precipitation to any appreciable extent.

3. The method of claim 1, wherein said patch has a size of between about 25 square miles and about 125 square miles.

4. The method of claim 1, wherein said third predetermined level less that 6.7 square miles per day.

5. The method of claim 1, wherein said first fertilizer comprises an iron chelate.

6. The method of claim 5, wherein said chelate comprises lignin acid sulfonate.

7. The method of claim 1, wherein said first fertilizer comprises trace minerals.

8. The method of claim 1, further comprising the step of sampling the amount of fish both inside the patch and outside the patch.

9. A method of increasing the seafood catch in the ocean comprising the following steps:
   (1) testing an area of the surface of the ocean to confirm that each required macronutrient is present at a first predetermined level that allows for the production of phytoplankton;
   (2) testing the area of the surface of the ocean to confirm that a first micronutrient is present at a second predetermined level which limits the production of phytoplankton;
   (3) testing the area of the surface of the ocean to confirm that the rate of diffusion is at a third predetermined level which allows for the production of a patch of phytoplankton;
   (4) sampling said area of the surface of the ocean to determine the concentration of seafood;
   (5) applying a first fertilizer comprising said first micronutrient to create the patch of phytoplankton in the area of the surface of the ocean; and
   (6) harvesting the seafood underneath and in the area of the patch.

10. The method of claim 9, wherein said step of sampling is repeated.

11. A method of creating a fish attractive device comprising the step of applying a first fertilizer to create a first patch of phytoplankton in an area of the surface of the ocean, wherein said first fertilizer comprises a first micronutrient, and wherein said patch has a size of more than about 0.5 square miles.

12. The method of claim 11, wherein said first first fertilizer releases an appropriate amount of said first micronutrient in a form that remains available to the phytoplankton such that said first micronutrient does not leave a photic zone of said area of the surface of the ocean by precipitation to any appreciable extent.

13. The method of claim 11, wherein said patch has a size of between about 25 square miles and about 125 square miles.

14. The method of claim 11, wherein the rate of diffusion of said first fertilizer from said patch is less that 6.7 square miles per day during the first ten days after said creation of said patch.

15. The method of claim 11, wherein said first fertilizer comprises iron.

16. The method of claim 15, wherein said first fertilizer comprises a chelate.

17. The method of claim 16, wherein said chelate comprises lignin acid sulfonate.

18. The method of claim 11, wherein said first fertilizer comprises trace minerals.

19. The method of claim 11, wherein diffusion of said first micronutrient from said patch into the surrounding ocean water does not decrease the concentration of said first micronutrient in a center of said patch to less than about 20% of the initial concentration, in about 10 days after the creation of said patch.

20. The method of claim 11, wherein diffusion of said first micronutrient from said patch into the surrounding ocean water does not decrease the concentration of said first micronutrient in a center of said patch to less than about 11% of the initial concentration, in about 40 days after the creation of said patch.

* * * * *